US009807982B2

(12) United States Patent
Hall

(10) Patent No.: US 9,807,982 B2
(45) Date of Patent: Nov. 7, 2017

(54) PET HEALTH MONITORING AND ANALYSIS

(71) Applicant: Edward Hall, Wilmington, NC (US)

(72) Inventor: Edward Hall, Wilmington, NC (US)

(*) Notice: Subject to any disclaimer, the term of this patent is extended or adjusted under 35 U.S.C. 154(b) by 0 days.

(21) Appl. No.: 14/791,179

(22) Filed: Jul. 2, 2015

(65) Prior Publication Data
US 2017/0000090 A1    Jan. 5, 2017

Related U.S. Application Data

(60) Provisional application No. 62/019,909, filed on Jul. 2, 2014.

(51) Int. Cl.
G08B 23/00 (2006.01)
A01K 29/00 (2006.01)

(52) U.S. Cl.
CPC .................. A01K 29/005 (2013.01)

(58) Field of Classification Search
CPC ..................................... A01K 29/005
See application file for complete search history.

(56) References Cited

U.S. PATENT DOCUMENTS

| 2005/0217591 | A1* | 10/2005 | Turner | A01K 5/0114 119/51.02 |
| 2006/0011145 | A1* | 1/2006 | Kates | A01K 15/021 119/719 |
| 2012/0000431 | A1* | 1/2012 | Khoshkish | A01K 15/023 119/720 |
| 2013/0186962 | A1* | 7/2013 | Kennett | G06K 1/128 235/494 |
| 2014/0290013 | A1* | 10/2014 | Eidelman | A44B 99/00 24/593.1 |
| 2014/0302783 | A1* | 10/2014 | Aiuto | H04W 52/16 455/41.2 |
| 2014/0302842 | A1* | 10/2014 | Lloyd | H04L 41/0806 455/426.1 |

(Continued)

OTHER PUBLICATIONS

Tagg Pet Tracker Review, Jun. 12, 2014, Steve Schwarz, http://agilitynerd.com/blog/agility/equipment/tagg-pet-tracker.html, downloaded May 14, 2016.*

(Continued)

Primary Examiner — Erin File

(57) ABSTRACT

A scalable pet ecosystem includes modules that are activated by an activity collar of a pet. The modules collect data, such as feeding, resting, and other biological functions. The data may be uploaded to a central server for reporting to an owner's computing device. An app on the computing device may be used to link multiple pets via the activity collars to multiple modules. Modules of the system may include a feeding bowl, a pet bed, an activity collar, and a litter box, and a water dish. A pet recognition device on the activity collar may identify a pet within the system. A profile may logically link the pet recognition device to one or more of the system modules. Collected data may be stored in a repository that is accessible to owners, veterinarians, and marketers via a phone app or server connection. The data may be analyzed to identify trends, to provide marketing and industry data, and to provide advice to owners.

10 Claims, 8 Drawing Sheets

(56) References Cited

U.S. PATENT DOCUMENTS

| | | | | |
|---|---|---|---|---|
| 2015/0070172 A1* | 3/2015 | Alasaarela | ............ | A61B 5/0022 340/573.1 |
| 2015/0342143 A1* | 12/2015 | Stewart | ................ | A01K 5/0275 119/51.02 |
| 2016/0192619 A1* | 7/2016 | Gibbs | ...................... | A01K 5/00 119/61.57 |

OTHER PUBLICATIONS

Tagg the Pet Tracker Review, Helena Stone, published Mar. 27, 2012, available at http://www.chipchick.com/2012/03/tagg-pet-tracker-review.html, last visited Dec. 19, 2016.*

* cited by examiner

PET HEALTH MONITORING AND ANALYSIS

I. CLAIM OF PRIORITY

This application is a continuation patent application of and claims priority from U.S. Provisional Patent Application Ser. No. 62/019,909, filed on Jul. 2, 2014, which is incorporated by reference hereto in its entirety for all purposes.

II. FIELD OF THE DISCLOSURE

The disclosure relates to pet care products, and more particularly, to the automated feeding and observation of pets.

III. BACKGROUND

Pet owners often delay taking their pets to receive veterinary help because they fail to recognize early signs and symptoms of potential health problems. Even when at their veterinarian, the owners are often unaware of specific feeding and other behavioral information that could be useful in diagnosing their pet. The lack of early treatment specific behavioral information can handicap pet diagnosis and treatment.

IV. SUMMARY OF THE DISCLOSURE

According to a particular embodiment, an apparatus includes a pet recognition unit configured to be attached to a pet and a first module responsive to proximity of the pet recognition unit. The module is configured to collect first data over time relating to a monitored activity of the pet.

According to another particular embodiment, an apparatus includes housing and a sensor positioned proximate to the housing, the sensor configured to detect a quantity relating to an activity of a pet. A controller is configured to collect first data over time relating to the detected quantity. The controller is further configured to identify the pet based a signal associated with a pet recognition unit.

These and other advantages and features that characterize embodiments are set forth in the claims annexed hereto and forming a further part hereof. However, for a better understanding of the invention, and of the advantages and objectives attained through its use, reference should be made to the Drawings sod to the accompanying descriptive matter in which there are described exemplary embodiments.

V. BRIEF DESCRIPTION OF THE DRAWINGS

VI. DETAILED DESCRIPTION

Figure 1:
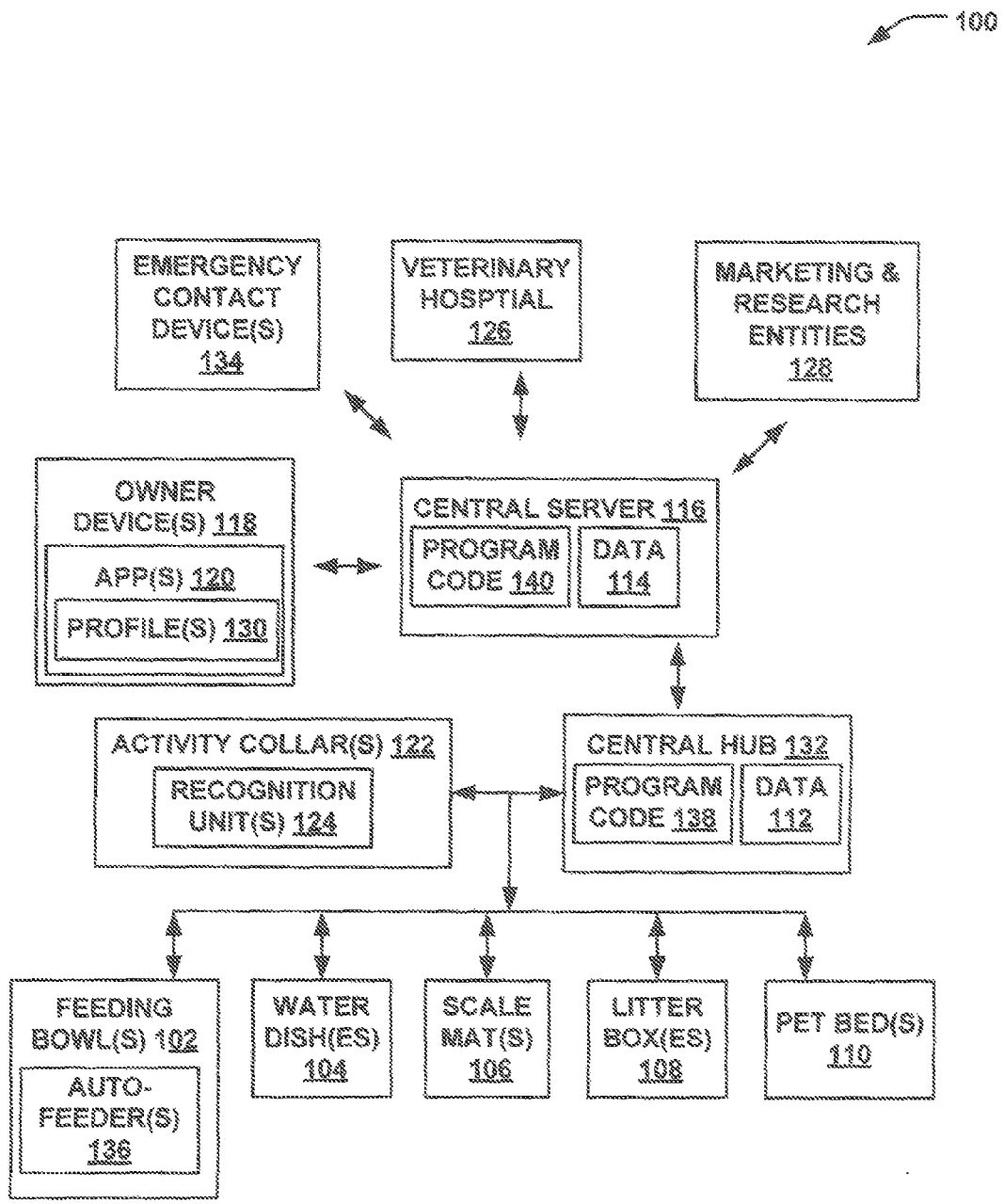
FIG. 1 is a block diagram of a system having plurality of networked modules configured to collect and analyze pet behavior.

An embodiment of a system includes a scalable pet ecosystem. The system may be designed for convenient owner use and to provide vital information to care providers. Modules of the system may include a feeding bowl, a central server, a pet bed, an activity collar, and a litter box, and a water dish. A pet recognition device on the activity collar may identify a pet within the system. A profile may logically link the pet recognition device to one or more of the system modules.

Wireless technology may be used to collect, analyze, and communicate health related data through monitored pet activities, such as eating and resting. Collected data may be stored in a repository that is accessible to owners, veterinarians, and marketers via a phone app or server connection. The data may be analyzed to identity trends, marketing and industry data, and provide advice to owners.

A controller may execute program code to process multiple inputs from multiple modules of the ecosystem. The controller may process the combination of inputs to determine additional information and assessments useful in tracking the health of a pet.

The feeding bowl may include communication circuitry, such as blue tooth, RFID, Wi-Fi and other wireless technologies. The feeding bowl may communicate with the collar and/or the central server. Another embodiment of the feeding bowl may communicate directly with user's phone, or such communication may occur indirectly via the central server and web application.

The feeding bowl may include a scale, volumetric scanning device, or other measuring device to track consumed food over time. Volumetric data may be tracked over time and used to determine eating trends. As discussed herein, the program code may use the volumetric data as one of multiple inputs used as a combination of factors to determine eating and other trends. The feeding bowl may include a delay to minimize incidences of false approaches (e.g., where an animal is merely walking by the feeding bowl, as opposed to approaching the feeding bowl to eat). A feeder reservoir, or automatic-feeder, may be used to regulate and automate feeding and portion control. The feeder reservoir may include a hopper and a motor that is controlled by the feeding bowl. The portion may be determined automatically based on health factors (e.g., age, breed, weight, etc.) or may entered manually. For instance, a user may input precise portions (e.g., ⅛th cup) into an app of a phone that is in communication with the bowl or the central server. The system may allow an owner to create a pet profile that includes dates and times for feeding. The feeding bowl may additionally include a memory, controller, and local user interface/display.

When allocating portions, the feeding bowl may account for food left in the feeding bowl during a prior feeding. To this end, the feeding bowl may determine if any portion of food remains in the bowl after a last feeding. The leftover portion may be stored and subtracted from an amount allocated during the next feeding session to prevent the pet from receiving more than its intended portion from the dispenser. An owner may use the phone app or user interface circuitry on the feeding bowl to assign an activity collar (and corresponding pet) to the feeding bowl.

The pet bed may be additionally linked to the activity collar device. The pet bed may include a scale to determine pet weight, the times they rest, number of times they rest, and the duration of those rest periods. A communications interface may communicate with the central server and/or the phone of the owner. The communications interface may additionally detect which pet is using the pet bed based on the pet's collar device. The pet bed may track rest without interfering with their natural behavior. The system generally only interferes with behavior that may potentially endanger an animal, such as the feeding bowl that prevents obesity. The system may only intervene on behaviors that would lead to direct health issues of the pet, like eating another pet's food or feces.

The litter box may include an automated lid that closes to retain smell and to keep a non-designated pet from entering (e.g., to eat other pet feces). The litter box may track urinalysis data, the times the litter box is used, the number of uses, and the duration of uses. An embodiment of the litter box may include a gas sensor. For example, a gas sensor could detect ammonia levels and be useful in diagnosing dehydration. In another example of a sensor, a sheet or PH sensor may be positioned on the bottom of the litter box for analysis. The sheet may be absorbent and in communication with sensors. Alternatively, the sheet may be removed and analyzed apart from the litter box. The litter box may include a controller, communication circuitry, and a user interface having a display.

The activity collar may include the pet recognition device. The pet recognition device may include a transmitter and a receiver (as with the other modules of the system). For instance, the pet recognition device of the activity collar may include a low energy communication device, such as Bluetooth Low Energy or RFID. As with the other modules, the activity collar may include a memory for storing data. The activity collar may track rest and movement. Towards this purpose, the activity collar may include an accelerometer or GPS circuitry. An activity collar may be linked to a pet profile. A single activity collar may be used in connection with multiple different modules. A profile may be reprogrammed for different pets, such as in a case when pet dies and is transferred to another pet. The activity collar may be reprogrammed with the new pet's profile.

The activity collar of an embodiment includes GPS technologies. A boundary or perimeter may be set for a pet from the central hub via the mobile application or web application. For example, a boundary of 200 ft from a central unit may be input by a user. When a pet crosses the boundary, automated alerts may be sent to persons and organizations associated with the profile of the pet. The boundary monitoring may be determined based on the RSSI of the Bluetooth collar device. To save on battery life, GPS may only activate once the pet crosses the perimeter.

A pet profile may be accessed using a user interface of app. For instance, a user may create one or more profiles associated with one or more pets. The app may display multiple profiles and may be facilitate the uploading of tracking information.

An app may include a calendar for veterinary and other pet appointments (e.g. vaccinations, checkups, etc.). Reminders may be tested to a phone of an owner from the app. According to a particular embodiment, the text may appear to come from the named pet.

A first aide portion of the app may include first aide instructions for an owner faced with an emergency situation requiring immediate first aide attention so the pet can be prepared to go to the veterinarian emergency hospital nearest to them.

Icons or symbols displayed on the app may include a feeding bowl that may be finger swiped to show feeding and other tracking data. Such data may be displayed in graph form for ease of reference. Data and trends of different pets may be displayed on a common graph using different colors.

The app is being designed to be able may be swiped through each pet's profile, providing a user dashboard to get an overall snapshot of all the pets' performance and data. A user may swipe through the different data points such as, the bowl feeding data, water dish hydration data, pet bed rest and weight data, activity collar physical activity data, perimeter tracking data, etc. The app may include different types of graphs and other infographics.

The app of a system may include feature that shows owners ideal shapes for their pets. Such a feature may be tied in with a camera app that allows a user to take a photograph of their pet and to compare it to the ideal shape for analysis (e.g., by comparing profiles).

An analysis section may display recommendations and advice to users based on veterinarian, pet nutritionist, and pet behaviorist recommendations as an issue is spotted. There may be an escalation of conditions as the data is tracked to go from recommended tips op to "take pet to your vet immediately. Options to either speak with a healthcare professional or to schedule an appointment may be presented. The veterinarian contacted may be stored as a primary veterinarian. The app may otherwise populate a list of nearby providers. Advice may save a trip to the veterinarian or prompt an owner to see one before a condition becomes more serious. The analysis may be determined using trends collected by the modules. As such, the trends are determined by the system, as well. Reports may be automatically prepared for and uploaded to veterinarians.

A scale mat may be positioned such that a pet will put weight upon it and be weighed. For example, the scale mat way be positioned proximate the feeding bowl. In a particular embodiment, the feeding bowl structure may be integral with and otherwise include a scale mat. In addition to sensor circuitry, the mat may include communication circuitry and/or a local user interface with display.

The activity collar of an embodiment may not taking readings directly from the pet. The activity collar may inform the modules such as the central hub, bowl, pet bed, water dish, and litter box, the location of the pet in order for the modules to perform the data collection. The data may be sent to the server via the central hub connected to the owner's Wi-Fi. The server may perform analytics on the different data sets to create an analysis of the pet's health data and disseminates it to the user's mobile and web application. Another embodiment may include a temperature sensor, heart rate sensor, or microphone, for instance, on the activity collar. The activity collar interfaces and initiates movement with the modules based on the proximity (and duration) of the activity collar relative to the module. The actual data collection is generated by the modules. In an embodiment, the modules relay data to the server via the activity collar, as opposed to a central hub (as described herein). As such, the activity collar of an embodiment may function as central hub. Illustrative data at a feeding bowl may include monitoring how many times the pet eats, how often it eats, and how much it eats at each session. The data is sent to a server where the analytics are processed to present the pet's eating behavior and tracking to the user. Data used to analysis the pet is generated using multiple data points in our algorithm.

The central hub may include a Wi-Fi unit that is placed within the household and connected to the house internet via Wi-Fi or wired connection. This unit may be plugged into the wall for power. The central hub receives the data from the other modules, such as the collar device, for proximity information, the bowl to collect the eating behavior data, the pet bed to collect rest and weight data, the water dish to collect drinking and hydration data, the litter box to collect bathroom data, etc. The hub is also the central location the designator is set with (e.g., a user may set a 200 ft perimeter from the central unit before GPS turns on, and the user is notified via their mobile device and web application).

Data (such as dietary data) may be determined automatically by an algorithm based on measured weight over time and food consumed over time. Activity may be determined over time, as well as how often a pet relieves itself in the litter box over time. Unsuccessful attempts to eat or use the litter box may also be recorded. Trends may reveal that an animal is eating and resting as much as usual, but is losing weight. Program code may determine trends over time. The trends may be used to further analyze a pet's condition and to recommend an action. Such actions may include modifying portions and rest periods, as well as over the counter remedies and advice to seek veterinary help. Collected data may be useful for health professionals, as well as for corporations responsible for producing products and targeted advertising.

FIG. 1 is a block diagram of an apparatus 100 in accordance with an embodiment. More particularly, a scalable pet ecosystem 100 includes modules 102, 104, 106, 108, 122 that are activated by an activity collar 122 of a pet. The modules 102, 104, 106, 108, 110, 122 collect data, such as feeding, resting, and other biological functions. The copies of the data 112, 114 may be uploaded to a central server 116 for reporting to an owner's computing device 118. An app 120 on the computing device 118 may be used to link multiple pets via the activity collar 122 to multiple modules 102, 104, 106, 108, 110. Modules 102, 104, 106, 108, 110, 122 of the system 100 may include a feeding bowl 102, a water dish 104, a scale mat 106, a litter box 108, a pet bed 108, and the activity collar 122. A pet recognition device 124 on the activity collar 122 may identify a pet within the system 100. A profile 130 of the app 120 may logically link the pet recognition device 124 to one or more of the system modules 102, 104, 106, 108, 110, 122. Collected data 112, 114 may be stored in a repository that is accessible to owners 118, veterinarians 126, and marketers 128 via the phone app and/or server connection. The data 112, 114 may be analyzed to identify trends, to provide marketing and industry data, and to provide advice to owners 118.

A central hub 132 may link to an owner's Wi-Fi network. The central hub 132 may include a mechanism to charge (wirelessly or wired) the modules 102, 104, 106, 108, 110, 122. Likewise, the central hub 132 may wirelessly communicate with the modules 102, 104, 106, 108, 110, 122. In one embodiment, the central hub 132 may perform analysis on collected pet data 114 for dissemination to the entities 118, 126, 128, 134.

The activity collar 122 may use wireless handshake technology to activate the modules 102, 104, 106, 108, 110. Add-ons the activity collar 122 may include motion sensing circuitry, GPS circuitry, and vitals sensing circuitry to gather temperature, pulse, etc.

The activity collar 122 may trigger the feeding bowl 102 to open to allow the pet to access food when the collar 122 is within a specified range. The food bowl 102 may prevent other pets from accessing the food, while additionally keeping out contaminants, wild animals, and pests. The food bowl 102 may use volumetric technology and scales to measure an amount of consumed food and to otherwise track the consumption of food. An auto-feeder 136 may include a hopper and motor that is recognized and actuated by the food bowl 102. In addition to tracking and reporting water consumption, the water dish 104 may automatically and periodically stir water to avoid stagnation.

The app 120 may communicate information, including trends and advice, to the owners and others. The health and behavioral data may be compared to metrics of pets of similar breeds. Alerts may be sent when a condition regarding the pet's health is detected.

Figure 2:
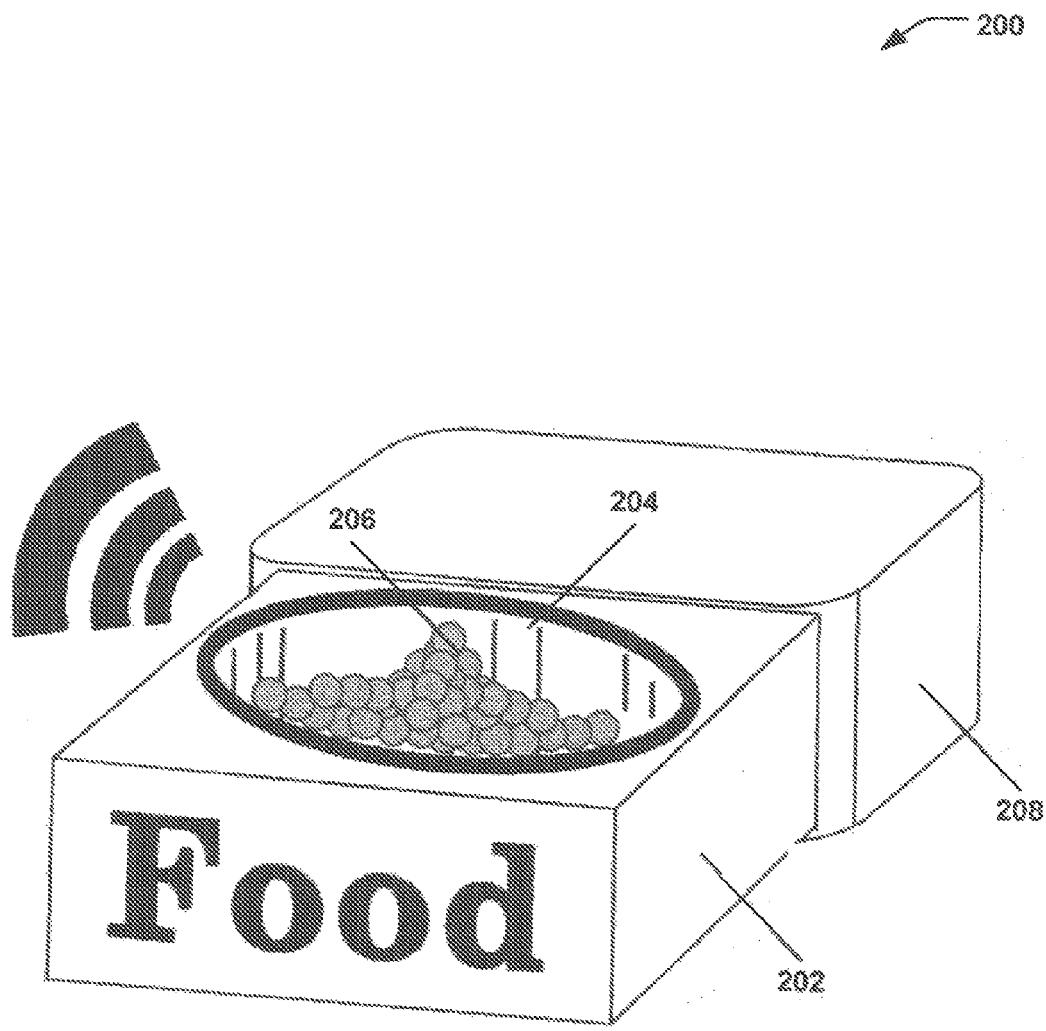
FIG. 2 is perspective view of a feeding bowl, such as the feeding bowl of FIG. 1.
Figure 3:
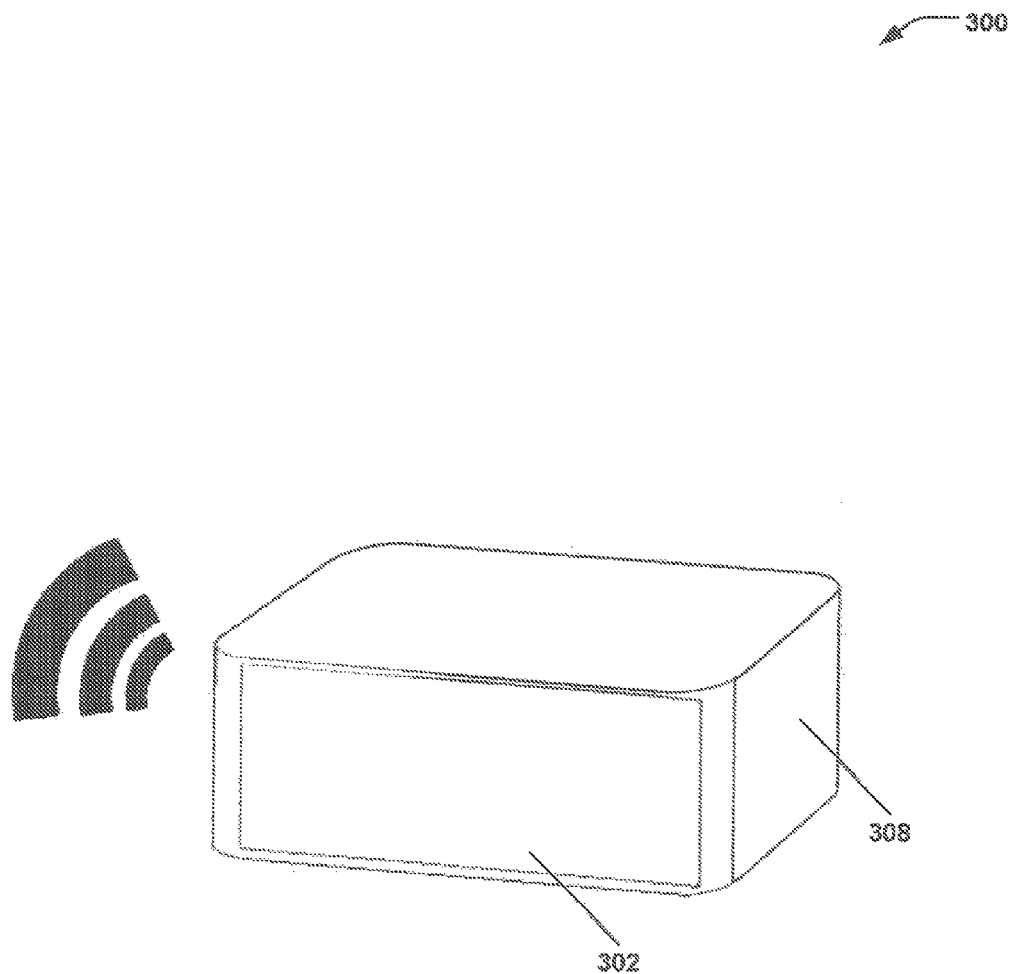
FIG. 3 is a perspective view of a feeding bowl, such as the feeding bowl of FIG. 2, in a closed position.

FIG. 2 is perspective view of a feeding bowl 200, such as the feeding bowl 100 of FIG. 1. The feeding bowl 100 includes a shelf portion 202 that includes a receptacle 204 containing food 206. The shelf portion 202 is configured to automatically retract into and extend out from a container portion 208. FIG. 3 shows a feeding bowl 300 in a closed portion. The feeding bowls 200, 300 in both FIG. 2 and FIG. 3 are configured to communicate feeding data wirelessly and to sense a proximity to an activation collar (not shown).

Figure 4:
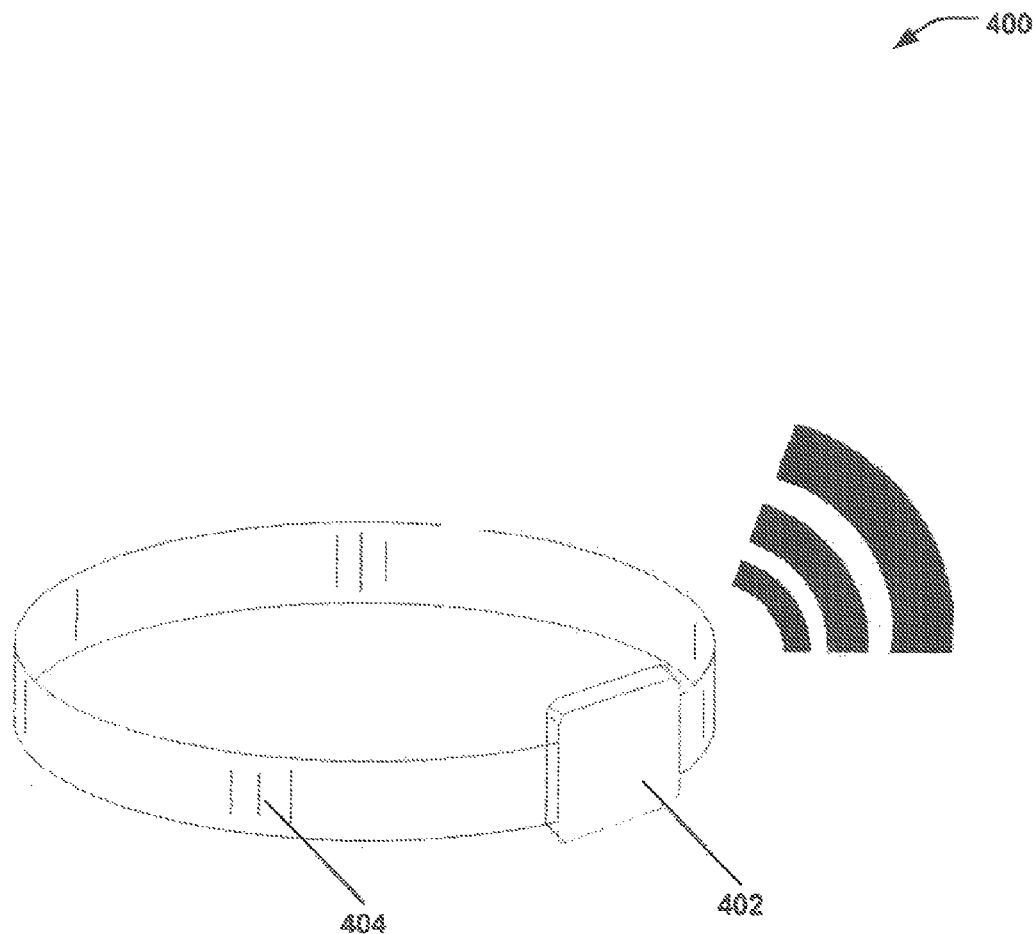
FIG. 4 is a perspective view of an activity collar, such as the activity collar of FIG. 1.

FIG. 4 is a perspective view of an activity collar 400, such as the activity collar 122 of FIG. 1. As explained above, the activity collar 400 may include circuitry 402 that is added to a collar portion 404. The circuitry 402 may include wireless communication hardware, in addition to recognition protocols, GPS, temperature sensors, moisture detectors, and other vital monitoring equipment.

Figure 5:
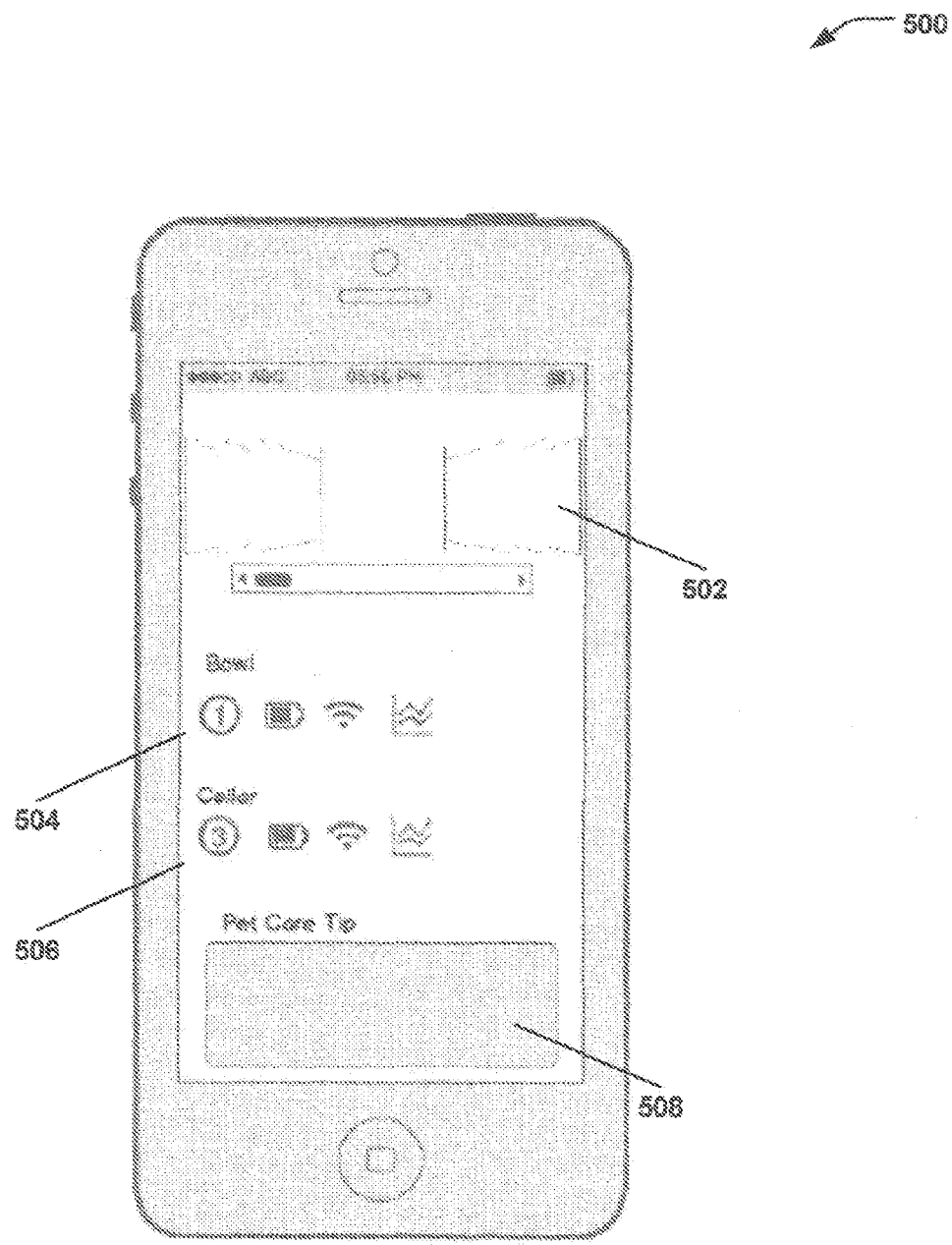
FIG. 5 illustrates a telephone displaying an app, such as the app of FIG. 1.

FIG. 5 illustrates a telephone 500 displaying an app, such as the app 120 of FIG. 1. The app includes a swiping selection section 502 that allows an owner or health professional to scroll between different features relating to different pets. A user may manipulate a section 504 of the app to review data relating to a feeding bowl. Another section 506 may allow the user to read data relating to an activity caller. As shown in FIG. 5, the data may relate to the behavior of the pet, as well as to the operational status of the bowl, collar, or other module.

Figure 6:
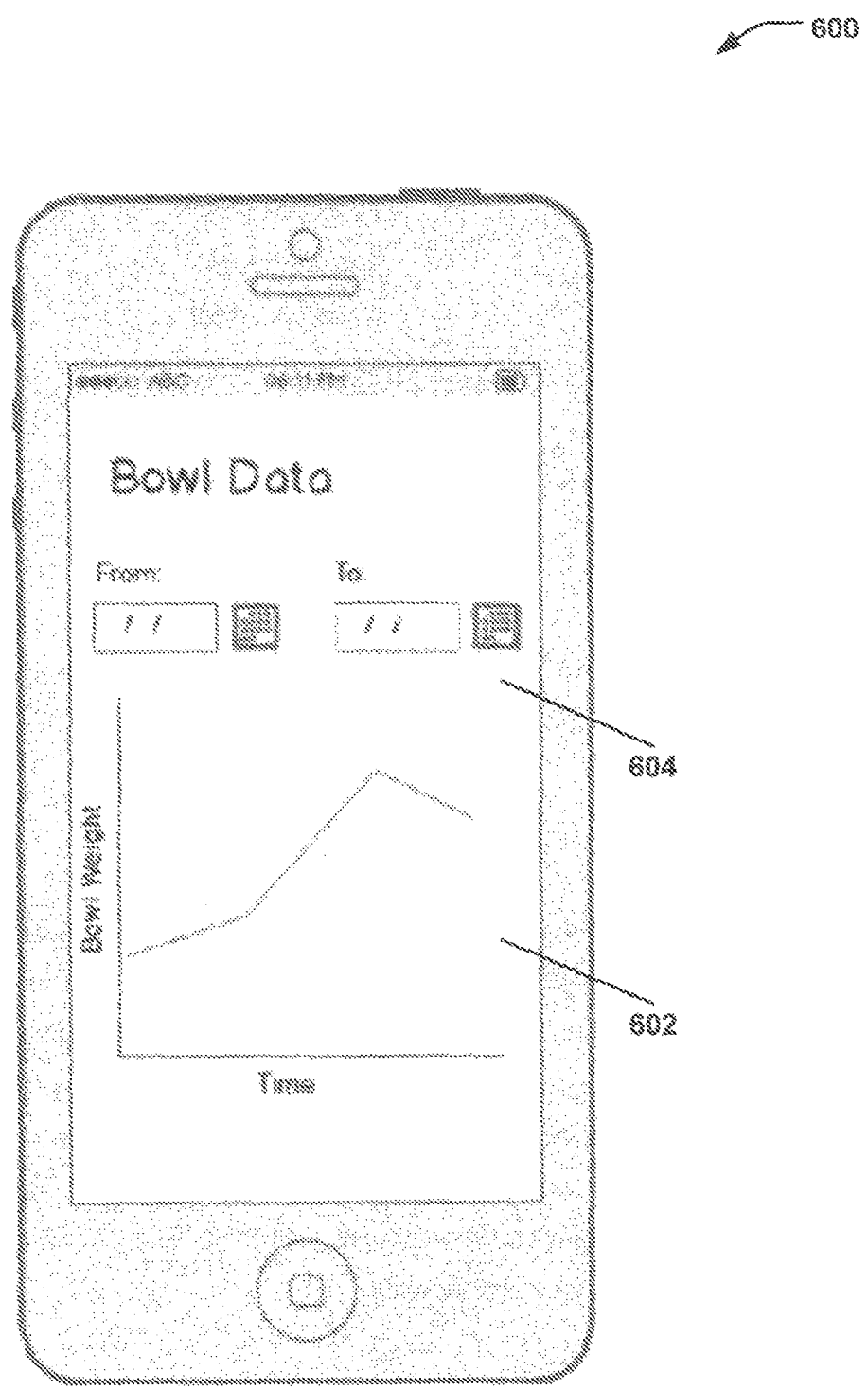
FIG. 6 illustrates a telephone displaying an app, such as the app of FIG. 5, detailing feeding behavior of a pet.

FIG. 6 illustrates a telephone 600 displaying an app, such as the app of FIG. 5, detailing feeding behavior of a pet. The app shows a graph 602 that illustrates an eating trend of the pet over time. A selection portion 604 may allow a user to designate a period of time for which to display the data.

Figure 7:
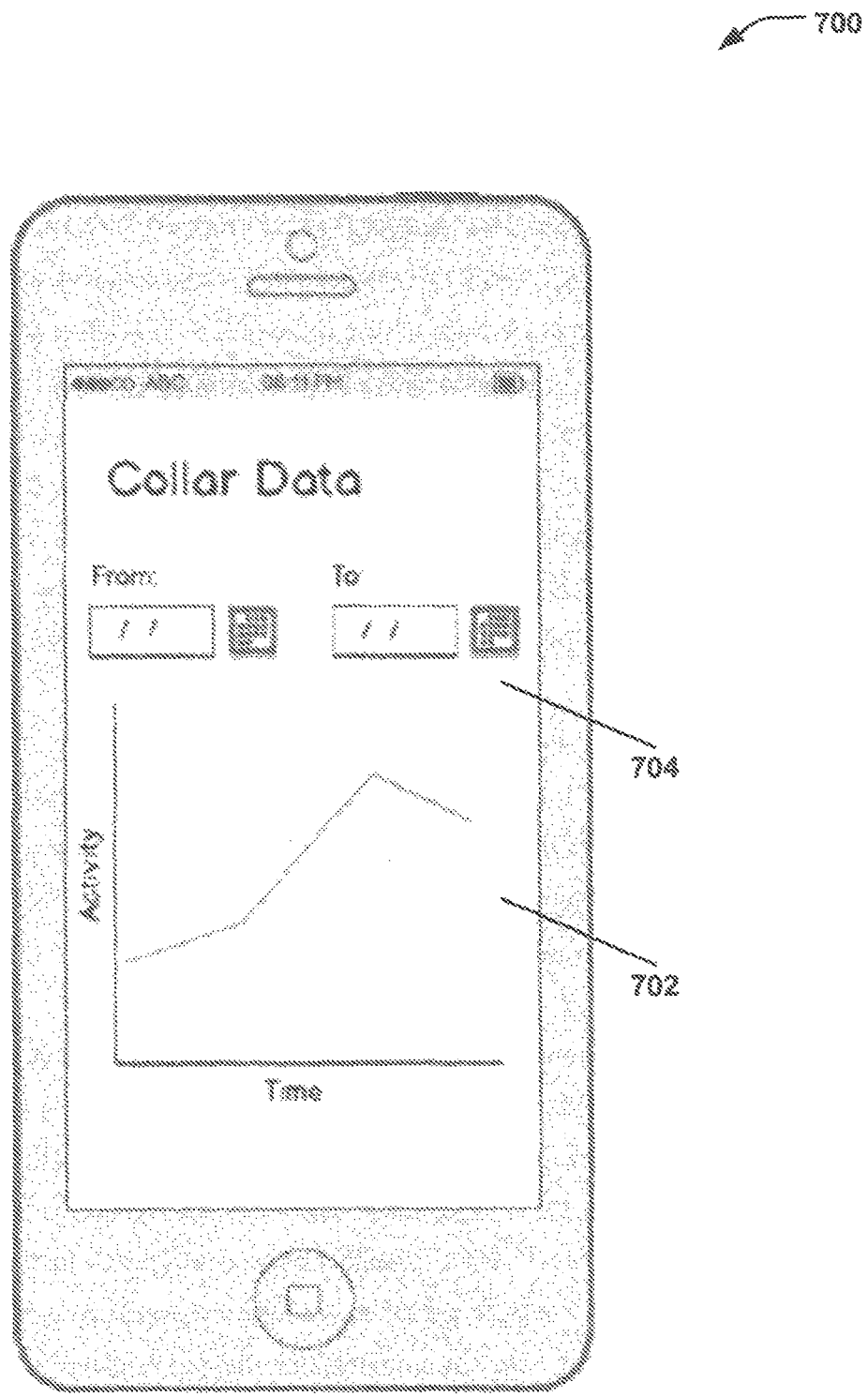
FIG. 7 illustrates a telephone displaying an app, such as the app of FIG. 5, detailing movement and activity of a pet.

FIG. 7 illustrates a telephone 700 displaying an app, such as the app of FIG. 5, detailing movement and activity of a pet. The app shows a graph 702 that illustrates activity/movement of the pet over time. A selection portion 704 may allow a user to designate a period of time for which to display the data.

Figure 8:
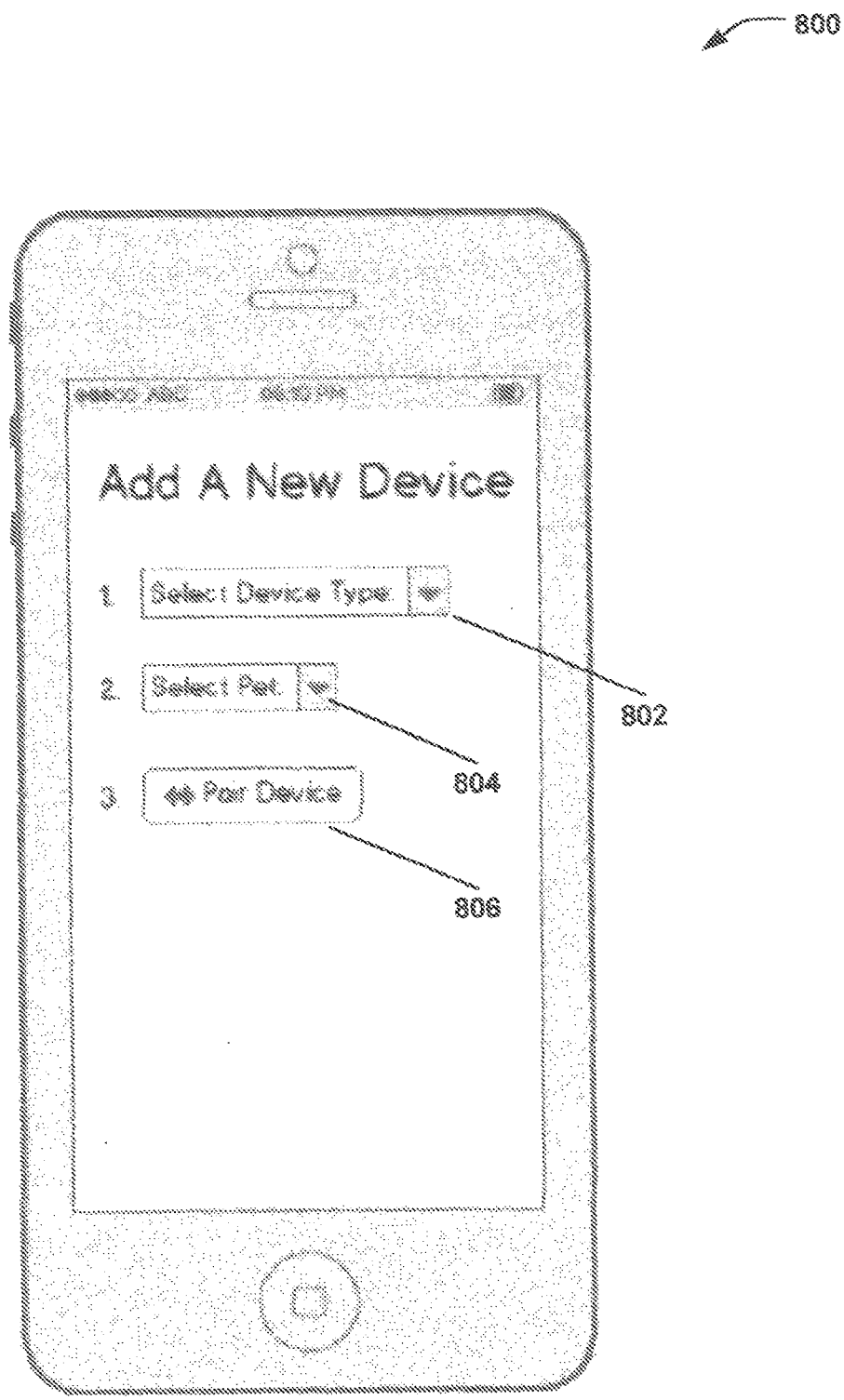
FIG. 8 illustrates a telephone displaying an app, such as the app of FIG. 5, detailing how to add a new device, or module, to a pet monitoring and analysis system, such as is shown in FIG. 1.

FIG. 8 illustrates a telephone 800 displaying an app, such as the app of FIG. 5, detailing how to add a new device, or module, to a pet monitoring and analysis system, such as is shown in FIG. 1. A scroll down selector 802 may allow a user to select a type of device to be added to the system. Another selector 804 may allow a selection of a pet to be associated with the new device, or module. A third selector 806 may allow the device to be paired with pet.

Those skilled in the art may make numerous uses and modifications of and departures from the specific apparatus and techniques disclosed herein without departing from the inventive concepts. Consequently, the disclosed embodiments should be construed as embracing each and every novel feature and novel combination of features present in or possessed by the apparatus and techniques disclosed herein and limited only by the scope of the appended claims, and equivalents thereof.

The invention claimed is:

1. An apparatus comprising:
   a pet recognition unit configured to be attached to a pet;
   a plurality of modules, each module of the plurality of the modules responsive to a proximity of the pet recognition unit and configured to collect information relating to the pet, wherein a first module of the plurality of modules includes a pet bed, wherein the pet may ingress or egress the pet bed from multiple directions, and wherein the information includes bed related data, the pet bed comprising:
      a sensor configured to collect the bed related data, wherein the bed related data includes at least two of: a pet weight, a duration of a resting occurrence, and a number of times a resting occurrence occurs during a period of time; and
   a hub including a processor executing program code configured to selectively communicate with each of the plurality of modules, wherein a communication link is established between each module of the plurality of modules and the hub.

2. The apparatus of claim 1, wherein the pet recognition unit is attached to an activity collar.

3. The apparatus of claim 2, wherein the hub is located on the activity collar.

4. The apparatus of claim 1, further comprising a memory storing a profile, wherein the profile logically associates the pet recognition unit with the pet and the first module.

5. The apparatus of claim 1, wherein the first module includes wireless communication circuitry.

6. The apparatus of claim 1, wherein a second module of the plurality of modules comprises at least one of a feeding bowl, a watering bowl, and a litter box.

7. The apparatus of claim 1, further comprising a motion sensor configured to track movement of the pet.

8. The apparatus of claim 1, further comprising an app for a phone configured to exchange information with at least one of the first module and a central server.

9. The apparatus of claim 1, wherein the program code is added to the hub as an aftermarket option to enable a communication link.

10. The apparatus of claim 1, wherein the processor is controllable by an app running on a remote computing device.

* * * * *